(12) United States Patent
Bruinsma et al.

(10) Patent No.: US 10,271,681 B2
(45) Date of Patent: Apr. 30, 2019

(54) BEVERAGE MAKING APPLIANCE, COMPRISING AT LEAST ONE TUBE FOR TRANSPORTING A LIQUID

(71) Applicant: KONINKLIJKE PHILIPS N.V., Eindhoven (NL)

(72) Inventors: Rodin Enne Bruinsma, Zuidhorn (NL); Fransiscus Hermannus Feijen, Leeuwarden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 103 days.

(21) Appl. No.: 14/427,397

(22) PCT Filed: Oct. 23, 2013

(86) PCT No.: PCT/IB2013/059566
§ 371 (c)(1),
(2) Date: Mar. 11, 2015

(87) PCT Pub. No.: WO2014/087272
PCT Pub. Date: Jun. 12, 2014

(65) Prior Publication Data
US 2015/0216354 A1 Aug. 6, 2015

Related U.S. Application Data

(60) Provisional application No. 61/718,760, filed on Oct. 26, 2012.

(51) Int. Cl.
*A47J 31/46* (2006.01)
*F16L 11/04* (2006.01)
*A47J 31/60* (2006.01)

(52) U.S. Cl.
CPC ............... *A47J 31/46* (2013.01); *A47J 31/60* (2013.01); *F16L 11/04* (2013.01)

(58) Field of Classification Search
USPC .................................................. 428/36.9, 40.1
See application file for complete search history.

(56) References Cited

U.S. PATENT DOCUMENTS 3,380,481 A * 4/1968 Kraus ................. B29C 47/0026
                                                138/118
3,583,424 A * 6/1971 Bryant .................... E02B 13/00
                                                138/121

(Continued)

FOREIGN PATENT DOCUMENTS

CN        2884630 Y     3/2007
CN      201994607 U     9/2011

(Continued)

OTHER PUBLICATIONS

Seam Seal Pipe, Downloaded From http://www.pexsupply.com/k-flex-6rxl038158-1-5-8-pipe-od-x-3-8-wall-insul-lock-pipe-insulation-6, Apr. 25, 2012, 3 Pages.

*Primary Examiner* — Ibrahime A Abraham
*Assistant Examiner* — Gyounghyun Bae

(57) ABSTRACT

A beverage making appliance includes at least one tube in the beverage making appliance for transporting a liquid from the beverage making appliance, where the at least one tube is provided with a slit extending along a length of the at least one tube between one end of the at least one tube and another end of the at least one tube. At the slit, the at least one tube is openable. Further, the at least one tube on each side of the slit provides a bias to each side of the slit to make contact along the slit to close the slit.

13 Claims, 2 Drawing Sheets

(56) References Cited

U.S. PATENT DOCUMENTS

| | | | | |
|---|---|---|---|---|
| 3,592,125 A * | 7/1971 | Tolmie | A47J 31/0573 | 392/467 |
| 3,878,360 A * | 4/1975 | Augustine | A47J 31/106 | 219/214 |
| 3,934,758 A * | 1/1976 | Kipp | B67D 1/08 | 222/108 |
| 4,013,101 A * | 3/1977 | Logan | B29D 23/001 | 138/122 |
| 4,142,840 A | 3/1979 | Kemp | | |
| 4,470,410 A * | 9/1984 | Elliott | A61M 5/52 | 128/877 |
| 4,628,989 A * | 12/1986 | Parker | B29C 61/0625 | 156/583.3 |
| 4,778,467 A * | 10/1988 | Stensaas | A61B 17/1128 | 128/898 |
| 4,803,103 A * | 2/1989 | Pithouse | B29C 61/0616 | 138/123 |
| 5,006,185 A * | 4/1991 | Anthony | F16L 59/023 | 138/151 |
| 5,104,388 A * | 4/1992 | Quackenbush | A61M 25/0668 | 604/164.05 |
| 5,176,866 A * | 1/1993 | Tanaka | B29C 33/505 | 249/184 |
| 5,277,227 A * | 1/1994 | Bradshaw | F16L 57/06 | 138/103 |
| 5,286,952 A * | 2/1994 | McMills | B29C 61/006 | 156/105 |
| 5,330,266 A * | 7/1994 | Stubaus | A47J 31/4485 | 261/DIG. 76 |
| 5,421,371 A * | 6/1995 | Lauer | F16L 59/022 | 138/110 |
| 5,604,976 A * | 2/1997 | Stobie | A61N 1/02 | 264/263 |
| 5,651,161 A | 7/1997 | Asta | | |
| 5,693,175 A * | 12/1997 | Jarrett | B27D 1/083 | 156/285 |
| 5,714,738 A * | 2/1998 | Hauschulz | F16L 53/005 | 138/33 |
| 5,916,183 A * | 6/1999 | Reid | A61F 5/05858 | 601/134 |
| 6,120,535 A * | 9/2000 | McDonald | A61F 2/92 | 623/1.39 |
| 6,235,134 B1 * | 5/2001 | Mueller | A63B 49/08 | 156/83 |
| 6,561,079 B1 * | 5/2003 | Muller | A47J 31/36 | 99/282 |
| 6,691,742 B1 * | 2/2004 | Cooper | F16L 3/14 | 138/106 |
| 2002/0112761 A1 * | 8/2002 | Lechuga | E03C 1/025 | 137/375 |
| 2004/0028863 A1 * | 2/2004 | Shamer | F16L 9/17 | 428/40.1 |
| 2004/0079431 A1 * | 4/2004 | Kissell | F16L 59/026 | 138/149 |
| 2006/0174771 A1 | 8/2006 | Frigeri | | |
| 2007/0000944 A1 * | 1/2007 | Cahen | A47J 31/4482 | 222/108 |
| 2007/0106356 A1 * | 5/2007 | Carstens | A41D 13/005 | 607/112 |
| 2007/0292647 A1 * | 12/2007 | Princell | B29C 65/5021 | 428/36.9 |
| 2008/0037969 A1 * | 2/2008 | Von Der Luhe | A47J 31/542 | 392/480 |
| 2009/0011105 A1 * | 1/2009 | Mahlich | A47J 31/401 | 426/564 |
| 2010/0018404 A1 * | 1/2010 | Villa | A47J 31/46 | 99/288 |
| 2010/0037971 A1 * | 2/2010 | Scherer | F16L 1/11 | 138/110 |
| 2010/0307821 A1 * | 12/2010 | Simonsohn | H02G 15/182 | 174/74 A |
| 2013/0025296 A1 * | 1/2013 | Leavitt | B65D 81/3484 | 62/4 |

FOREIGN PATENT DOCUMENTS

| | | |
|---|---|---|
| GB | 2125276 A | 3/1984 |
| JP | 54132059 A | 4/1978 |
| JP | 2003502195 A | 1/2003 |
| JP | 2003065468 A | 3/2003 |
| JP | 2010265679 A | 11/2010 |

\* cited by examiner

BEVERAGE MAKING APPLIANCE, COMPRISING AT LEAST ONE TUBE FOR TRANSPORTING A LIQUID

CROSS-REFERENCE TO PRIOR APPLICATIONS

This application is the U.S. National Phase application under 35 U.S.C. § 371 of International Application No. PCT/IB2013/059566, filed on Oct. 23, 2013, which claims the benefit of U.S. Provisional Patent 61/718,760, filed on Oct. 26, 2012. These applications are hereby incorporated by reference herein.

FIELD OF THE INVENTION

The invention relates to a beverage making appliance, comprising at least one tube for transporting a liquid.

BACKGROUND OF THE INVENTION

Beverage making appliances are generally known. Among other things, beverage making appliances comprise a tube system for transporting a liquid, which may be a liquid to be used in a beverage making process as an ingredient of the beverage which is obtained as a result of the process. The liquid may be water, which is often used in beverage making processes. Another example of the liquid is milk.

The invention is applicable to various types of beverage making appliances, including appliances comprising a so-called milk frother. In general, frothing a liquid involves supplying a gas like air to the liquid and mixing the liquid with the gas, for the purpose of obtaining a mass of bubbles in the liquid, which is referred to as foam. Especially in the field of making coffee and coffee specialties, appliances are used which are capable of frothing milk in an automated manner. It is a well-known option to combine a frothing process of milk with a heating process of milk, wherein air is supplied to the milk for obtaining foam, and wherein steam is supplied to the milk for increasing the temperature of the milk.

In a practical embodiment, a milk frother comprises a jug for containing milk. During a milk frothing process, i.e. a process for making hot frothed milk, milk is sucked from the jug through a suction tube. Although the milk frothing process can be performed in a satisfactory manner, the application of the suction tube has a major drawback. The fact is that the suction tube is difficult to clean. Moreover, milk residue inside the suction tube dries up as time passes, so that the cleaning problem is even worse when there is a considerable time period between a last time that the milk frother was operated and a cleaning action. For sake of completeness, it is noted that a cleaning action normally involves rinsing the tube with water by forcing a quantity of water to flow through the suction tube, wherein the water may be at a high temperature in order to have an optimal cleaning effect.

US 2006/0174771 A1 discloses a milk frother which comprises a milk container, a foaming device and a valve assembly. The foaming device is provided with three channels, namely a steam supply channel, an air supply channel and a milk supply channel. The latter channel serves for transporting milk from the milk container to a mixing channel where the actual milk frothing process takes place during operation of the milk frother, and has a horizontally extending portion. Among other things, US 2006/0174771 A1 teaches that the foaming device is easy to clean and provides anti-microbial activity when the channels of the foaming device are provided with a surface constituted by nanoparticles, being both hydrophobic and oleophobic, wherein at least some of the nanoparticles consist at least partially of silver or a silver compound.

In respect of cleanability, it is furthermore taught that even if the milk frother is relatively unsusceptible to contamination, it should be cleaned regularly. In this respect, is it noted that cleaning can be performed by means of a flushing program in which at least the ducts, bores and channels which are critical as far as contamination is concerned are flushed with hot water. Another possibility as mentioned consists in lifting the foaming device off the milk container, so that it is possible to expose the inner parts of the foaming device which are critical as far as contamination is concerned, including the horizontally extending portion of the milk supply channel, and cleaning those parts in a dish washer.

US 2006/0174771 A1 is just one example of a document in which bothersome measures for cleaning a channel for transporting milk are described. The information as can be found in US 2006/0174771 A1 underlines the fact that cleaning such a channel normally involves rinsing of the channel on a regular basis. Also, it is demonstrated that costly measures can be proposed in an attempt to decrease the extent to which the channel gets contaminated with milk residue in the first place.

SUMMARY OF THE INVENTION

It is an object of the invention to provide a solution to the problems associated with cleaning a channel for transporting milk in a milk frother, at minimum additional costs. This object is achieved by providing a beverage making appliance which comprises at least one tube for transporting a liquid, wherein the tube is provided with a slit extending along a length of the tube between one end of the tube and another end of the tube, and wherein the tube is openable at the position of the slit.

When it comes to a tube which is used for transporting a liquid, it is not at all obvious to think of a possibility of providing the tube with a slit, such that the tube can be opened for cleaning purposes. The invention goes against the bias that having a slit in a tube for transporting liquid causes liquid to leak from the tube during use. In particular, according to an insight underlying the invention, it is possible to have a fully closed condition of the slit during use and a condition in which the tube is opened at the position of the slit for cleaning purposes.

When the solution according to the invention is applied in a milk frother, all that a user of the milk frother needs to do for cleaning a milk supply tube of the milk frother is taking the milk supply tube out of the milk frother, pulling the tube open so as to expose an inner surface of the tube, for example, by inserting two fingertips through the slit and moving the fingertips in opposite directions, cleaning the tube by letting (hot) water or another suitable cleaning liquid flow over the inner surface while keeping the tube in the opened condition, closing the tube again, and putting the tube back in place in the milk frother again. These actions are simple and remove any doubt a user may have about whether the milk frother is clean and safe to use, or not.

It will be understood that having a slit in a tube is a cheap alternative to the solutions known from the art in respect of cleaning a tube, and offers an option of obtaining optimal cleaning results with a minimum use of cleaning liquid.

Within the framework of the present invention, the tube may have any suitable shape, and the same is applicable to the slit. In a practical embodiment of the beverage making appliance according to the invention, the tube is straight, and the slit is straight as well and extends in a longitudinal direction of the tube. Another option is to have a straight tube and a helix-like slit in the tube.

It may be so that the slit extends along the entire length of the tube, i.e. from one end of the tube to another end of the tube, so that it is possible to open the tube entirely. Nevertheless, within the framework of the invention, other possibilities exist, for example a possibility according to which the slit does not extend all the way to the ends of the tube, so that the tube can have end portions which are closed along their periphery, which may be practical for the purpose of connecting the tube to other components of the beverage making appliance. As long as the end portions are not too large in a longitudinal direction of the tube, it is still possible to clean the entire tube on the basis of the fact that a major part of the tube can be opened, wherein the inside of the tube at the position of the end portions can be easily accessed from two sides, namely from outside the tube and from the opened part of the tube.

It is advantageous for the tube to comprise a flexible material, because in that case, the tube may have the condition in which the slit is closed as a default condition. When the tube is put to the opened condition by a user, the user exerts a force which counteracts the inclination of the tube to return to the default condition. As soon as the user releases the tube, the tube is free to be in the default condition again. A practical example of the flexible material is silicon, which does not alter the fact that many other types of material are suitable to be used.

In the closed condition of the slit, the tube can be leakproof as long as two surfaces of the tube which are present at opposite sides of the slit contact each other along the length of the slit. In particular, one possibility is that the closed condition of the slit is obtained on the basis of a situation in which edges of the tube which are present at the position of the slit abut against each other. Another possibility is that the closed condition of the slit is obtained on the basis of a situation in which edge portions of the tube which are present at the position of the slit overlap each other. A wall thickness of the tube and the flexibility of the tube may be chosen such that the first possibility can actually be put to practice. Furthermore, properties of the material which is used in the tube may contribute to sufficient and liquid-tight closure of the tube. For example, the material may be chosen such as to have a kind of stickiness at the surfaces, so that self-adhesive effects are obtained. In particular, the material may be a rubber material.

It is noted that within the framework of the invention, it is possible to use a sleeve or another type of casing for snugly enclosing the tube in the closed position of the slit. In that case, the casing can have a function in maintaining the correct shape of the tube, wherein contact between the surfaces for closing the slit is guaranteed. The casing may have flexible properties. For example, assuming a straight or slightly curved appearance of the tube for transporting the fluid, the casing may also be shaped like a tube, wherein the tube for transporting the fluid is inserted into the casing at one end and moved further up the tube by pulling and/or pushing. Having a casing is not essential for guaranteeing fluid-tightness, which does not alter the fact that it may be desirable to combine the tube with a casing in practical situations, even though it may require effort from a user to remove the tube from the casing for cleaning purposes and insert the tube into the casing again.

Yet another possibility for closing the slit is based on an embodiment of the tube in which edge portions of the tube at the position of the slit are adapted to engage each other. In particular, the edge portions may have complementary shapes, wherein one of the edge portions is snugly received by another of the edge portions when the edge portions are made to contact each other. For the purpose of establishing the necessary contact and realizing engagement of the edge portions of the tube, the tube may further comprise a zip element for joining the edge portions, wherein the zip element comprises recesses for receiving the edge portions, and wherein the zip element is movable along the length of the tube. Hence, the tube may be closeable and openable on the basis of a zip which is provided in the slit, wherein the zip may be of the kind which is commonly known from plastic zip lock bags, for example.

When it comes to connecting an end of the tube to another component of the beverage making appliance according to the invention, it is preferred to use a component having a space for receiving and accommodating the end of the tube, especially when the slit extends all the way to that end, as in that case, it is ensured that the tube is not pulled open at the end as the shape of the end is preserved on the basis of an encompassing function of the component.

The above-described and other aspects of the invention will be apparent from and elucidated with reference to the following detailed description of a basic embodiment of a tube for use in a beverage making appliance according to the invention, an embodiment of the tube in which the tube is shaped like a T, and an embodiment of the tube comprising a zip.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
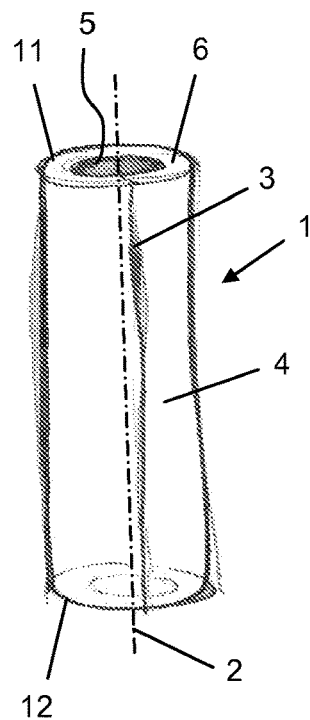
FIG. 1 diagrammatically shows a perspective view of a basic embodiment of a tube for use in a beverage making appliance according to the invention, wherein a slit of the tube is shown in a closed condition.
Figure 2:
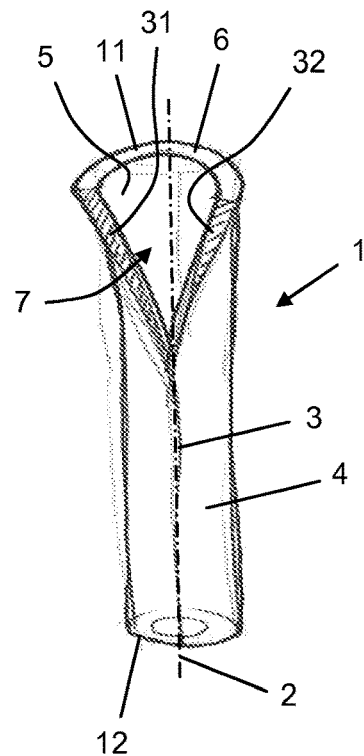
FIG. 2 diagrammatically shows a perspective view of the tube as shown in FIG. 1, wherein the tube is partially opened at the position of the slit.

FIGS. 1 and 2 show a basic embodiment of a tube 1 for use in a beverage making appliance according to the invention. The beverage making appliance may be any type of beverage making appliance, wherein a milk frother is mentioned as an example. The tube 1 is suitable for transporting a liquid in the appliance. The invention is especially relevant in situations in which cleanability of the tube 1 is an issue, which is the case when the liquid is milk, for example.

As the general concept of a beverage making appliance is commonly known, particulars of such an appliance will not be elucidated in this text. For the purpose of understanding the invention, it suffices to focus on the fact that a beverage making appliance is equipped with at least one tube for enabling liquid flows through the beverage making appliance as necessary for making a beverage. Particularly, the beverage making appliance may comprise a container for containing a quantity of liquid, wherein a tube is used for transporting the liquid from the container to a space and/or another tube for mixing the liquid with at least one other liquid and/or a gas. The types of tube as will be described in the following are very well suitable to be applied as such a liquid transporting tube, wherein one end of the tube is adapted to be associated with the container.

The tube 1 as shown in FIGS. 1 and 2 is a straight tube having planar end faces and a circular inner periphery and outer periphery around a longitudinal axis 2 of the tube 1. The tube 1 is provided with a slit 3 which extends along the length of the tube 1. In the shown example, the slit 3 extends from one end 11 of the tube 1 to another end 12 of the tube 1, wherein both a cutting line of the slit 3 in an outer surface 4 of the tube 1 and a cutting line of the slit 3 in an inner surface 5 of the tube 1 extend substantially parallel to the longitudinal axis 2 of the tube 1.

The tube 1 is made of a flexible material such as silicon. FIG. 1 shows a default condition of the tube 1, which is a condition in which the slit 3 is closed on the basis of the fact that edges 31, 32 of the slit 3 abut against each other. The tube 1 may be manufactured by providing a normal tube and making the slit 3 in the tube 1 by cutting through the wall 6 of the tube 1, wherein a cutting tool and the tube 1 are moved with respect to each other in the direction in which the longitudinal axis 2 of the tube 1 extends. In that case, it is ensured that the default condition of the tube 1 is a condition in which the tube 1 is shaped like the basic tube, apart from the fact that the tube 1 comprises a slit 3 as described in the foregoing.

In the default condition of the tube 1, the tube 1 is suitable to be used for transporting a liquid. The liquid will follow the path of least resistance, which is a path in the longitudinal direction of the tube 1 rather than a path between the edges 31, 32 of the slit 3.

When it is desired to clean the tube 1, the tube 1 can be put from the default condition to an opened condition by pulling the edges 31, 32 of the slit 3 away from each other, so that an opening 7 is obtained in the tube 1 at the position of the slit 3, as illustrated in FIG. 2. As soon as all contact between the edges 31, 32 of the slit 3 is lost, it is possible to put the tube 1 to a totally planar condition, in which it is very easy to perform a cleaning action on the tube 1. For sake of completeness, it is noted that having the slit 3 is not only advantageous in view of cleaning purposes. For example, on the basis of the fact that the tube 1 can be put to an opened condition, it is also possible to remove obstructions from the tube 1.

In respect of the arrangement of the tube 1 in a beverage making appliance, it is noted that it is practical if the tube 1 can be easily removed from the appliance and be put back in place in the appliance again with hardly any effort. This is the case when the ends 11, 12 of the tube 1 are simply held in sockets on the basis of friction, for example, wherein a further use of fastening means is omitted, so that a user needs to do nothing more than pull the ends 11, 12 from their respective sockets when the tube 1 needs to be taken out and insert the ends 11, 12 in their respective sockets when the tube can be arranged in the appliance again.

Figure 3:
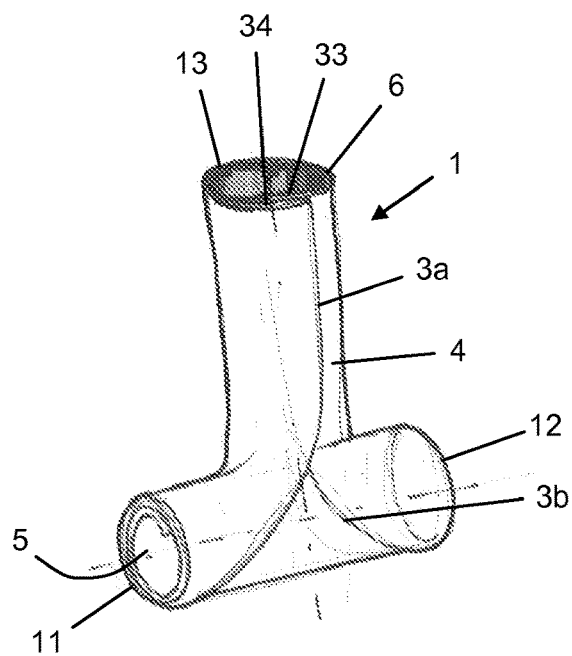
FIG. 3 diagrammatically shows a perspective view of an embodiment of the tube in which the tube is shaped like a T.
Figure 4:
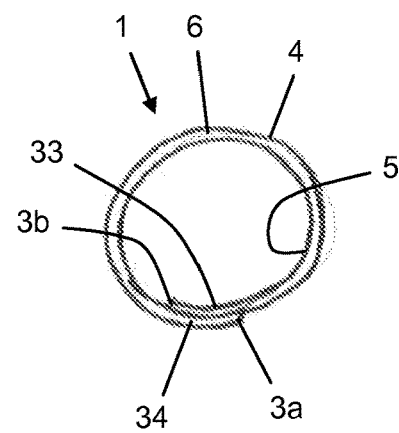
FIG. 4 serves to illustrate an overlapping configuration of edge portions of the tube.

In the basic embodiment of the tube 1 as shown in FIGS. 1 and 2, the default condition involves abutment of the edges 31, 32 of the slit 3 against each other. In FIGS. 3 and 4, another possibility is illustrated, namely a possibility according to which the default condition involves overlap of edge portions 33, 34 of the tube 1 at the position of the slit 3. In that case, the tube 1 is liquid-tight in the default condition on the basis of contact between an outer surface of an inner edge portion 33 and an inner surface of an outer edge portion 34. Additionally, FIG. 3 serves for demonstrating the fact that the tube 1 does not necessarily need to have a straight shape. In particular, FIG. 3 shows an embodiment of the tube 1 in which the tube 1 is shaped like a T, and in which the tube 1 has three ends 11, 12, 13 and is therefore suitable to serve as a joint of three other tubes to be connected to the tube 1, for example. In this embodiment, all sections of the tube 1 can still be openable on the basis of the presence of two curved slits 3a, 3b as shown, wherein one slit 3a extends between an end 13 which is at the bottom of the T shape and an end 11 which is at one side of the transverse arm of the T shape, and wherein another slit 3b extends between the end 13 which is at the bottom of the T shape and an end 12 which is at an opposite side of the transverse arm of the T shape.

Figure 5:
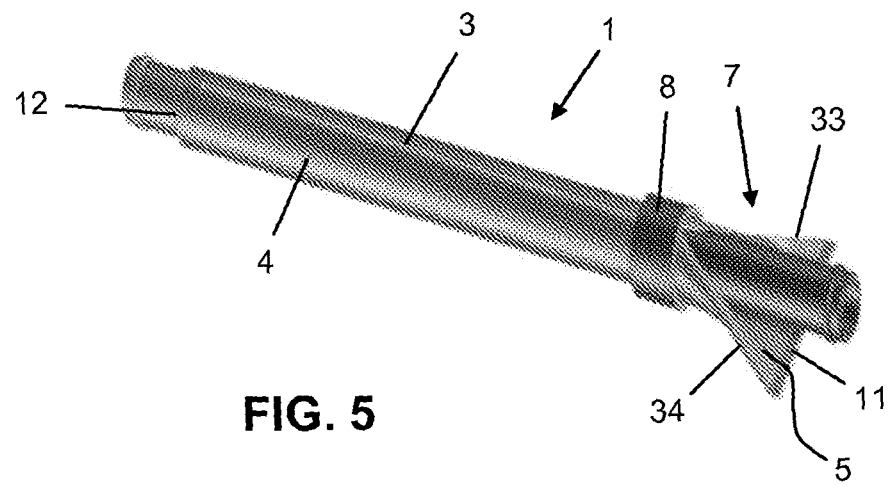
FIG. 5 diagrammatically shows a perspective view of an embodiment of the tube comprising a zip, wherein the zip is shown in a closed condition.
Figure 6:
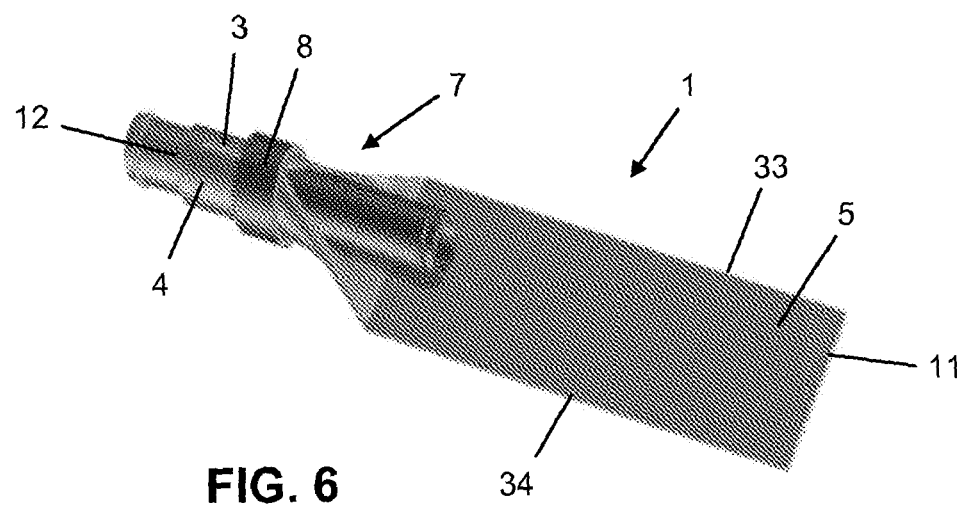
FIG. 6 diagrammatically shows a perspective view of the tube as shown in FIG. 5, wherein the zip is shown in an opened condition.

FIGS. 5 and 6 show an embodiment of the tube 1 in which a closed condition of the slit 3 is obtained on the basis of a zip function. In particular, the edge portions 33, 34 of the tube 1 at the position of the slit 3 can be adapted to engage each other, and a zip element 8 can be used for putting the edge portions 33, 34 in contact with each other or releasing an engagement between the edge portions 33, 34. As is the case with zips which are known per se, the zip element 8 is arranged such as to be moveable along the length of the zip, wherein the zip element 8 performs an opening function of the zip during movement in one direction, and wherein the zip element 8 performs a closing function of the zip during movement in another direction. Like known zip elements, the zip element 8 comprises recesses (not shown) for receiving the edge portions 33, 34. The recesses are preferably oriented according to a V shape, wherein the edge portions 33, 34 are kept apart along the arms of the V shape, and wherein the edge portions 33, 34 are joined at the bottom of the V shape.

FIG. 6 shows the possible planar appearance of the tube 1 in the opened condition. For sake of completeness, it is noted that the planar appearance does not only allow for easy cleaning, but also provides a possibility of winding the tube 1 in the planar appearance on a reel, for example. This may especially be handy for applications of the tube 1 in another context than the context of beverage making appliances.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention can be summarized as follows. A beverage making appliance comprises at least one tube 1 for transporting a liquid, particularly a tube 1 which is provided with a slit 3 extending along a length of the tube 1 between one end 11, 12, 13 of the tube 1 and another end 11, 12, 13 of the tube 1. At the position of the slit 3, the tube 1 is openable, which is advantageous for cleaning purposes. Hence, the tube 1 is very well applicable in appliances such as milk frothers in which liquids are used which are apt to cause contamination of a system for transporting those liquids. It is possible to use elastic material in the tube 1, so that the tube 1 can be folded open for assuming a flat appearance.

The invention claimed is:

1. A beverage making appliance, comprising:
a frother input; and
at least one silicone tube coupled to the frother input of the beverage making appliance and configured to transport a beverage making liquid through the at least one silicone tube to the frother input of the beverage making appliance, wherein the at least one silicone tube is provided with a slit extending along a whole length of the at least one silicone tube between one end of the at least one silicone tube and another end of the at least one silicone tube and has a constant inner and outer diameter along the whole length, and wherein the at least one silicone tube is openable at the slit, with the at least one silicone tube formed to provide a bias to each side of the slit to automatically return to a default condition wherein the slit is closed and the silicone tube returns to being suitable for transporting the liquid after removal of an opening force.

2. The beverage making appliance according to claim 1, wherein the at least one silicone tube is straight, and wherein the slit is straight and extends in a longitudinal direction of the at least one silicone tube.

3. The beverage making appliance according to claim 1, wherein the at least one silicone tube comprises a flexible material.

4. The beverage making appliance according to claim 1, wherein the at least one silicone tube on each side of the slit provides the bias such that edges of the at least one silicone tube at the slit abut against each other.

5. The beverage making appliance according to claim 1, wherein the at least one silicone tube on each side of the slit provides the bias such that edge portions of the at least one silicone tube at the slit overlap each other.

6. The beverage making appliance according to claim 1, wherein edge portions of the at least one silicone tube at the slit are adapted to engage each other.

7. The beverage making appliance according to claim 6, further comprising a zip element for joining the edge portions of the at least one silicone tube for establishing engagement of the edge portions, wherein the zip element comprises recesses for receiving the edge portions, and wherein the zip element is movable along the length of the at least one silicone tube.

8. The beverage making appliance according to claim 1, wherein the slit extends from one end of the at least one silicone tube to another end of the at least one silicone tube.

9. The beverage making appliance according to claim 1, further comprising a component having a space for receiving and accommodating an end of the at least one silicone tube.

10. The beverage making appliance according to claim 1, further comprising a container for containing the liquid to be transported by the at least one silicone tube, wherein one end of the at least one silicone tube is associated with the container.

11. The beverage making appliance according to claim 1, wherein an outer surface of the at least one silicone tube on each side along the length of the slit is planar with the bias provided by the at least one silicone tube providing contact between the outer planar surface on each side along the slit to close the slit.

12. The beverage making appliance according to claim 1, wherein the at least one silicone tube is formed from a flexible material to a pipe shape that inherently has a residual stress to return the slit to the default condition.

13. The beverage making appliance according to claim 1, wherein the at least one silicone tube is formed from a sticky material that self-adheres each side of the slit together when each side of the slit makes contact along the slit.

* * * * *